United States Patent [19]

Schweikl et al.

[11] 4,266,725
[45] May 12, 1981

[54] EXHAUST SECTION OF A REACTION ENGINE

[75] Inventors: Ludwig Schweikl, Moosburg; Christian Greune, Füstenfeldbruck; Paul Lottes, Puchheim, all of Fed. Rep. of Germany

[73] Assignee: Motoren-und Turbinen-Union Munchen GmbH, Munich, Fed. Rep. of Germany

[21] Appl. No.: 83,069

[22] Filed: Oct. 9, 1979

[30] Foreign Application Priority Data

Oct. 17, 1978 [DE] Fed. Rep. of Germany ....... 2845149

[51] Int. Cl.³ .............................................. B64C 15/00
[52] U.S. Cl. ................................................ 239/265.19
[58] Field of Search ...................... 239/265.11, 265.19, 239/265.39, 265.41

[56] References Cited

U.S. PATENT DOCUMENTS

| | | | |
|---|---|---|---|
| 2,846,844 | 8/1958 | O'Rourke | 239/265.41 X |
| 3,054,256 | 9/1962 | Minos | 239/265.41 X |
| 3,599,875 | 8/1971 | Wynosky | 239/265.41 |
| 3,972,475 | 8/1976 | Nelson | 239/265.41 X |

*Primary Examiner*—Richard A. Schacher
*Attorney, Agent, or Firm*—Alan H. Levine

[57] ABSTRACT

An exhaust section of a reaction engine, especially for aircraft, including a fixed pipe and a nozzle pipe carried by the fixed pipe. Pins project from each pipe into slots in the other pipe, and each of a plurality of actuating elements extends between, and is pivoted to, the exteriors of both pipes. The actuating elements are adjustable lengthwise to pivot the nozzle pipe with respect to the fixed pipe. There may be four pairs of pins and slots, and four actuating elements. Each actuating element may include two cooperating actuating members, one of the members being pivoted to the fixed pipe and the other member being pivoted to the nozzle pipe. The actuating members may be a hydraulic piston/cylinder device or a threaded spindle and nut arrangement. Means are provided for operating the actuating elements of each diametrically-opposed pair in opposite directions. The pins and slots may be carried by supporting arms projecting longitudinally from the pipes.

14 Claims, 7 Drawing Figures

EXHAUST SECTION OF A REACTION ENGINE

This invention relates to an exhaust section of a reaction engine, especially for aircraft, having a fixed pipe and a nozzle pipe arranged on it for pivotal movement in all directions.

An exhaust section of this type is disclosed in U.S. Pat. No. 3,438,581, where a universal joint is used to swivel the nozzle pipe, or an exhaust nozzle, omnidirectionally about a fixed center. The universal joint shown in the patent is arranged inside the fixed pipe and the nozzle, which involves the following disadvantages: the universal joint is exposed to the hot gases, which is a special detriment when the afterburner is being operated; the bearings of the universal joint are arranged in the same area, and bearing problems ensue as a result of the hot gases; also, the flow of gas is restricted by the universal joint and the struts. A further consideration is that the immense forces prevailing in the exhaust nozzle must be transferred to the pivot center through struts, and to the exterior through additional struts. These struts cause an additional weight penalty.

A broad object of the present invention is to provide means for enabling omnidirectional swiveling movement of the nozzle pipe about a practically fixed pivot center, whereby the presence in the stream of hot gas of a universal joint plus power transmitting parts and their attendant disadvantages are obviated, so that among other benefits, little structural weight and little structural space is required for transmitting the forces.

It is a particular object of the present invention to provide an arrangement wherein the fixed pipe and nozzle pipe are joined by pins and slots, and by actuating elements which are longitudinally adjustable to pivot the nozzle pipe with respect to the fixed pipe. These characteristic features permit the nozzle pipe to be swiveled omnidirectionally about a practically fixed pivot center while eliminating the need for a single large inner or outer universal joint. The hot-gas-wetted interior of the two pipes is free from a universal joint and power transmitting elements. This prevents disadvantages mentioned above from arising. The pins and the longitudinal slots extending generally parallel to the pipes, which are means associated with the pipes or provided directly or indirectly on the pipes for guidance, are not arranged in the interior of the pipes. The actuating elements are likewise not arranged in the interior but rather outside the outer circumferences of the two pipes. Each actuating element is hinged to each of these pipes by a universal joint or similar provision. The pins and the lengthwise slots economize space and weight. This applies equally to the externally arranged actuating elements. These extend generally parallel to the pipes, their long dimensions pointing in this direction, and together with their hinge provisions, they radially project only a little beyond the outer circumferences of the pipes. This is no great disadvantage considering that this area will often have to also accommodate means for varying the nozzle area. Tail resistance remains at a relatively moderate level.

The pin-and-slot guidance serves to transmit the transverse forces, the axial forces being transmitted by the "linear" actuating elements. This makes it possible to separate the axial from the transverse forces and to distribute the axial forces over several points of transfer. As a result, the deformation of the pipes under heavy loads is minimized and made much less severe than in the case of the known construction employing a universal joint, while at the same time reducing the overall weight of the swivelling means. Transverse forces are transferred tangentially to the pipes as they are being pivoted one counter the other, and these forces can be absorbed with the aid of relatively minor stiffening expedients. Owing to the uniform distribution of forces and the advantageous nature of the load imposed on the components the stiffness-to-weight ratio is favorable. This plus the advantages inherent in the pin-and-slot guidance result in modest space requirements.

The pivot center, or center of the joint, is defined by the pin-and-slot guidance and by the "linear" actuating elements. The geometry, i.e., the circumferential and axial positions of the pins, longitudinal slots, and pivotal points of the actuating elements, can be optimized or attuned one to the other such that the longitudinal centerlines of the two pipes will intersect at practically one and the same point for all smaller vector angles of the nozzle pipe, i.e., from 0° to 15° or 20°, and for all pivotal directions (all of which are especially for aircraft attitude control in the stalled condition). Consequently, this pivot center remains substantially the same in the axial and radial direction of the pipes. The pivotal movement, then, is practically that of a universal joint, which permits workable solutions to the problem of sealing against the exit of hot gas through the gap between the pipes or at their ends. The arrangement of the exhaust section is generally such that the aft end of the fixed pipe is inserted in the front end of the nozzle pipe. The arrangement can also be reversed, however. Between these two ends, at least one of which takes the shape of a coaxially arranged shallow cup, there normally exists a radial gap extending over 360°. The gap is then sealed with a coaxially arranged sealing ring, and proper sealing is thereby ensured in any of the intended pivotal positions of the nozzle pipe.

Further objects and advantages of the present invention will become apparent from the following description. Moreover, some characteristic features of the invention are briefly summarized below.

The actuating elements are arranged in a direction parallel to the pipes, and the pivotal points and the pins are arranged in transverse planes and in the same longitudinal planes, but circumferentially spaced apart by 25° to 30° where space is lacking, or for other reasons. There are four pins and associated longitudinal slots circumferentially equally spaced and arranged alternately on the two pipes, and two pairs of actuating elements arranged crosswise, whereby the transverse plane of the rear pivotal points of the actuating elements lies only a little aft of the transverse plane of the pins unless an alternative arrangement is selected; if the alternative arrangement is selected, only a single pivotal axis is needed for each pivotal point, so that the need for a universal joint is obviated. Additionally, the pivot center will not shift significantly even at extremely wide vector angles of the nozzle pipe. Now, when the actuating elements of either pair of actuating elements are moved in opposite directions, the nozzle pipe is pivoted about one of two mutually perpendicular transverse axes, with the pivot center substantially retaining its position. This arrangement of the pins (and longitudinal slots) alternately on the two pipes prevents the pivot center from shifting from the longitudinal centerline of the fixed pipe.

With regard to the actuating elements and their restricted coupling use is made of the following arrangement: each actuating element includes two cooperating actuating members of the pivotal arrangement. These are preferably a cylinder and a piston having a rod, but could be a spindle (pivot spindle), preferably a ballscrew spindle and an associated nut. In the former case, two diametrically opposite pistons are energized inversely for adjustment in opposite directions, and restricted coupling or synchronization is achieved by means of a rack mechanism with a flexible shaft. In the latter case, the two spindles or similar means are driven in opposite directions using flexible shafts synchronized by a pair of gears, preferably via bevel gearsets. Axial forces are transferred to the pipes or their stiffening flanges through the pivotal points of the actuating elements or actuating members at four circumferentially and equally spaced points.

The longitudinal slots and pins may be provided indirectly on the pipes, i.e., via supporting arms. The supporting arms may be connected to the pipes by a three-point attachment, in which case the force can be transferred at circumferentially equally spaced points of the two pipes. This reduces the deformation of the pipes and reduces the need for stiffening expedients, which is an important consideration for the effectiveness of the seal between the two pipes. Since the pin-and-slot guidance will transmit transverse forces only, the supporting arms are each stressed in only one plane, so that they can be made of lightweight plate construction with stiffening provisions for buckling strength. The supporting arms transfer the transverse forces tangentially to the stiffening flanges of the pipes. These flanges can be used, in addition to the three-point attachment of the supporting arms, to accommodate the pivotal points of the actuating elements or actuating members of such elements. The supporting arms can be designed to provide pivotal points for actuating means, such as spindles, serving to effect variations in the nozzle area.

For the purpose of making the pivot center practically fixed, it will also be helpful to make the nozzle pipe axially adjustable, and for this purpose, the actuating elements or actuating members are made adjustable endwise.

The exhaust section of a reaction engine of the present invention, if used for aircraft, incorporates an afterburner or afterburner unit which can be flange-bolted to a basic engine as a pre-assembled module. Such an exhaust section comprises at least two subassemblies. One subassembly includes a forward afterburner pipe, this being the fixed pipe, with heat shield, supporting arms, swivelling spindles, actuators, and flexible shaft. The other subassembly includes a swivelling afterburner pipe, this being the nozzle pipe, with a heat shield, supporting arms, and a nozzle. The two subassemblies are assembled by sliding one into the other axially, with the pin-and-slot guidance, the seal and the heat shield engaging each other.

Vectoring control of the nozzle pipe is achieved as follows: the pilot selects the vector angle, and the specified values for the pairs of actuating elements or members, e.g., spindle pairs, are then determined by computer logic. Comparison of the specified with the actual values then produces the signal energizing the actuating motor or air motor. The speed of the motor is fed back to enhance the stability of the control circuit and to reduce overshoot. Transmitters indicating the vector angle can optionally be arranged in the longitudinal slots for direct and, thus, accurate sensing of the angle. The actual values for the positions of the pairs of actuating elements or members are then obtained by conversion in additional computer logic. It is also possible to pick up and report the position of the spindle or similar means at the actuating motor or air motor proper.

The place of the pins can alternatively be taken by sliding guide blocks or rollers. The longitudinal slots will generally be open at the edges of the pipes. This applies equally when the longitudinal slots are arranged in the supporting arms. The longitudinal slots are at least long enough to permit the nozzle pipe to be vectored through the intended maximum angle, so that the pins will not bottom at the inner ends of the slots. The means for the cardan or similar type of pivoted connection can optionally be conventional with cardan ring or rings, ball and socket type, or the like, provided they permit swiveling in all directions about one point.

Embodiments of the present invention are schematically illustrated on the accompanying drawings, in which.

Figure 1:
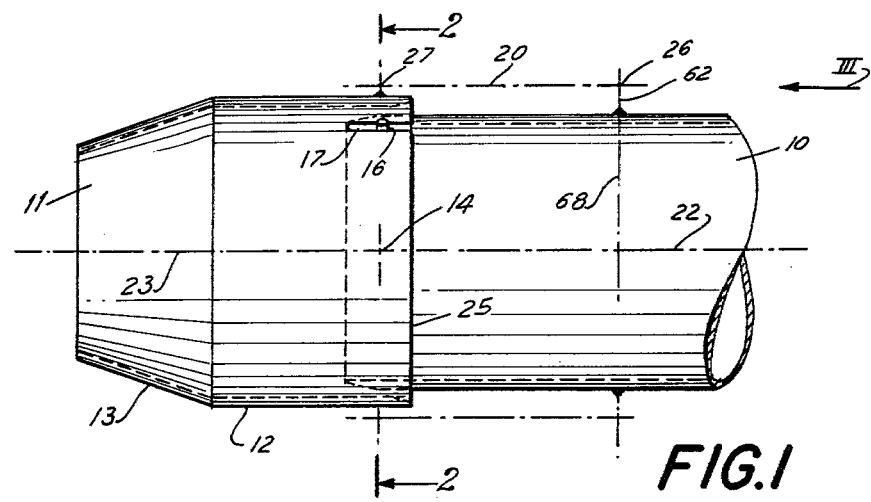
FIG. 1 is a longitudinal view, from the direction of arrow I in FIG. 2, of a first embodiment of an exhaust section according to their invention.
Figure 2:
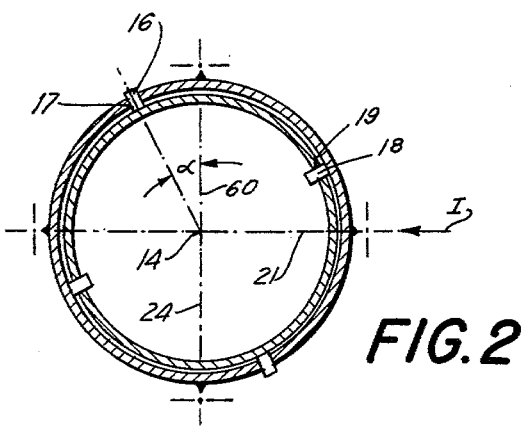
FIG. 2 is a cross-sectional view taken along line 2—2 of FIG. 1.

With reference now to FIGS. 1 and 2 the exhaust section comprises a fixed cylindrical pipe 10 and a nozzle pipe 11 consisting of a cylindrical portion 12 and a nozzle 13 tapering towards the rear. The nozzle pipe 11 is illustrated in its nontilted position, wherein the longitudinal centerline 22 of the pipe 10 and the centerline 23 of the pipe 11 are aligned with each other. At its forward end, the pipe 11 envelopes the rear end of the pipe 10, there being a radial spacing between the two pipes. The relative radial position of the pipes 10 and 11 is determined by means of two radially arranged, and diametrically opposite, cylindrical pins 16 which are fixed to the pipe 10 and engage in longitudinal slots 17 in the pipe 11, and by two such pins 18 fixed to pipe 11 for engagement in longitudinal slots 19 in the pipe 10. The relative axial position of pipes 10 and 11 is determined by four actuating elements 20 which extend parallel to the longitudinal centerline 22 of the pipe 10, which are equally spaced over the 360° circumference, and which are hinged by a universal joint or similar expedient to the pipes 10 and 11.

The pins 16 extend along a line normal to the longitudinal centerline 23. These lines both lie in a single plane, which is that containing section 2—2. The longitudinal slots 17 and 19, respectively, have parallel walls, run parallel to the longitudinal centerlines 23 and 22, respectively, and start at the front edges 25 and 15, respectively, of the pipes 11 and 10. Edges 25 and 15 lie in planes extending at right angles to their respective centerlines. The longitudinal slots 17 and 19 are equal in length, their length approximately corresponding to the distance axially between the edges 25 and 15.

Figure 6:
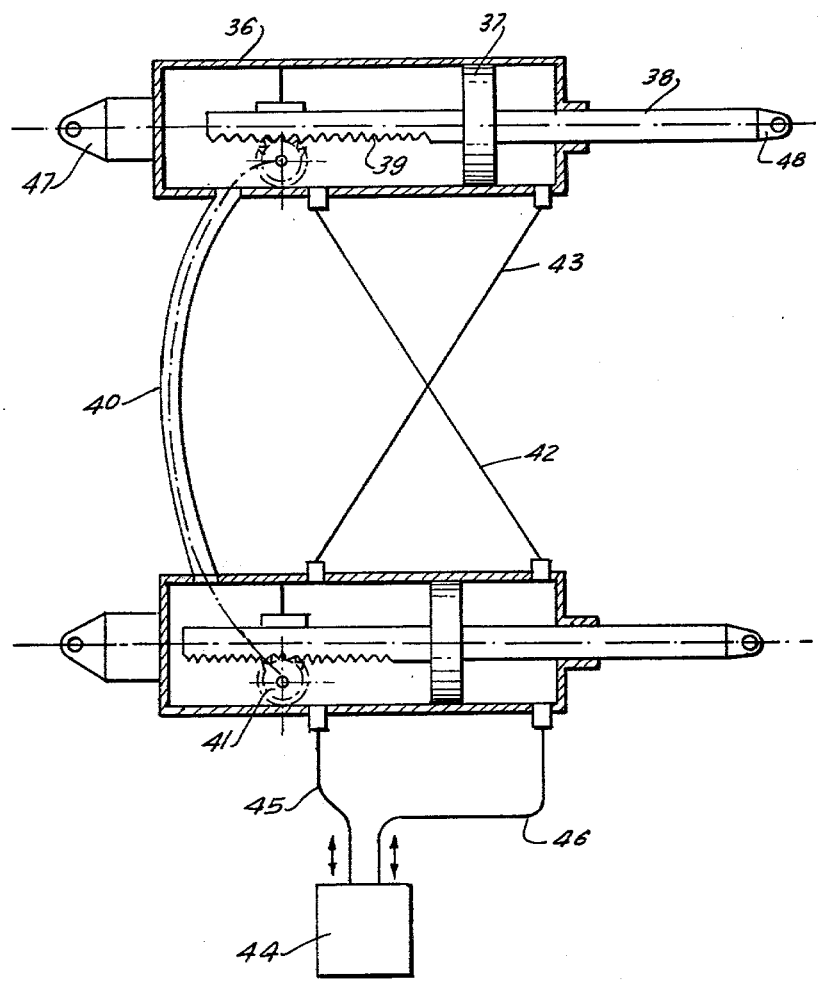
FIG. 6 illustrates a pair of actuating elements, of a special type, and associated control elements.
Figure 7:
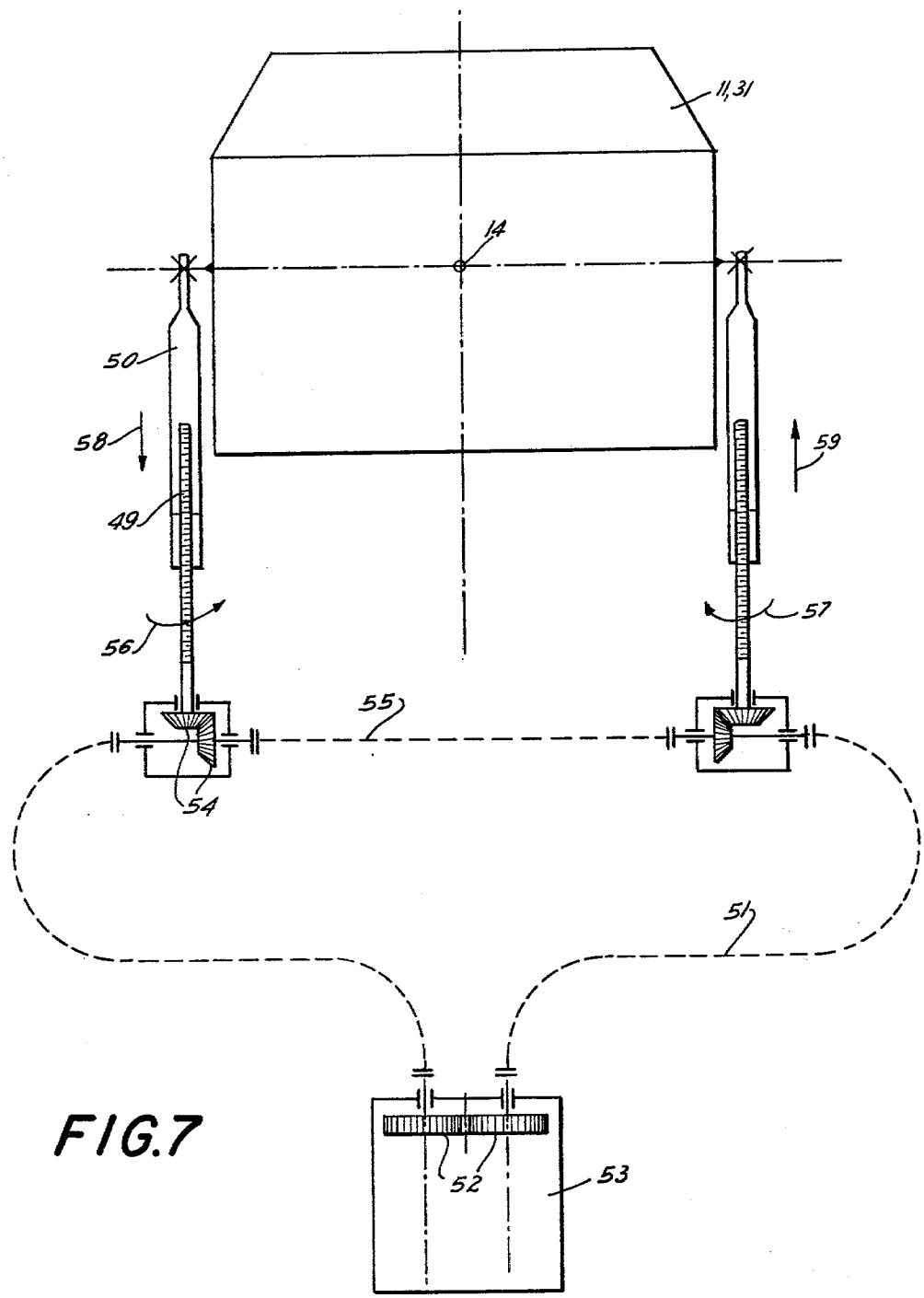
FIG. 7 illustrates a pair of actuating elements, of a different type, plus associated actuating means.

The universal joints for the actuating elements 20 are represented by their hinge points. These hinge points are generally indicated by the numerals 26 and 27. Each pair of hinge points is circumferentially spaced 27.5° (angle α) from one of the pins 16 and 18. The rear hinge points 27 extend in a plane normal to the centerline 23 and a little aft (only about 3 mm when the diameter of the cylindrical portion of the pipe 11 is 800 mm) of the cross-sectional plane 2—2 containing the pins 16 and 18; in FIG. 1 these planes practically coincide. The forward hinge points are in a plane 68 normal to the longitudinal centerline 22. The pipe 11 is angularly moveable about the transverse axis 21 and the transverse axis 24, which are mutually perpendicular, the two axes extending in the cross-sectional plane 2—2 and intersecting at the pivot center 14. Pivotal movement is achieved by the longitudinal adjustment of the actuating members of diametrically opposite actuating elements 20, which are illustrated in FIGS. 6 and 7. The numeral 60 (FIG. 2) is used to indicate a longitudinal plane.

Figure 3:
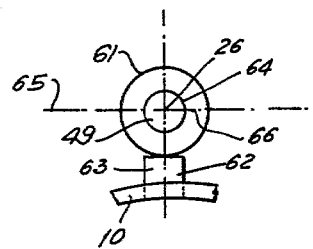
FIG. 3 is an enlarged fragmentatary view of the exhaust section of FIG. 1 seen from the direction of arrow III in FIG. 1.

With reference now to FIG. 3 the numeral 26 indicates a forward universal joint to pivotally connect, e.g., a spindle 49 (FIG. 7). An outer ring 61 is pivotally connected to a radial pin 62, fixedly seated in the pipe 10, for movement about a radial axis 63. Arranged in outer ring 61, by means of pins 66 seated in the outer ring, is an inner ring 64 for angular movement about an axis 65 which extends normal to the axis 63 and lies in the plane of the outer ring. The spindle 49 is rotatably arranged in the inner ring 64 and longitudinally fixed with respect to ring 64. In the rear universal joint 27, the inner ring is omitted, the pins 66 are arranged in the radial axis, and the radial pin 62 is replaced with two angles, pivotally connected to which is the ring 61 for rotation about the other axis 65. A nut 50 is pivotally connected at its aft end to the pins 66 for rotation about the radial axis and is prevented from movement both circumferentially and endwise.

Figure 4:
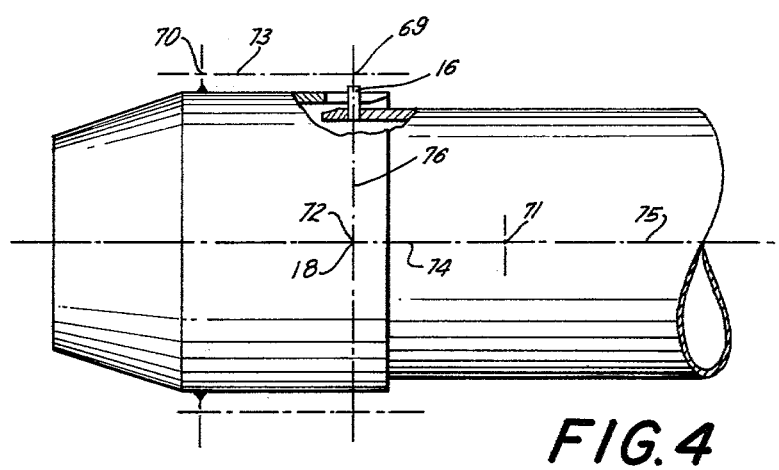
FIG. 4 is a longitudinal view, similar to FIG. 1, of a second embodiment of an exhaust section according to the present invention.

In the construction illustrated in FIG. 4, the pins 16 are fixed to the pipe 10 and the pins 18 fixed to the pipe 11 (which may be the case also with the arrangements of FIGS. 1 and 2), and the hinge axes 69 and 72 of the universal joints extend through the pins 16 and 18, i.e., the planes containing the hinge axes 69 and 72 also contain the pins 16 and 18.

Figure 5:
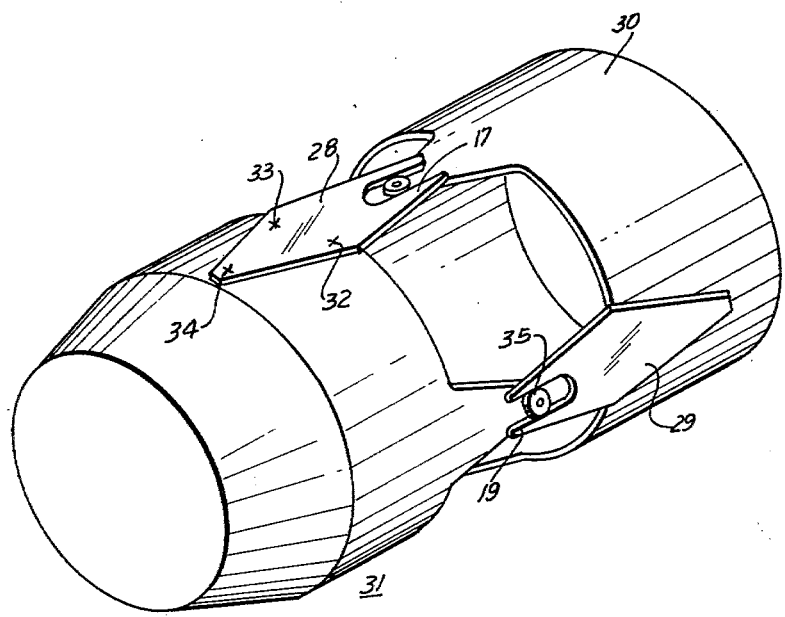
FIG. 5 is a perspective view illustrating a third embodiment of an exhaust section according to the present invention.

FIG. 5 illustrates supporting arms indicated by the numerals 28 and 29. The supporting arms are attached at three points 32, 33, and 34, to, alternately, a forward fixed afterburner pipe 30, and the cylindrical portion of a pivotally arranged afterburner pipe 31. They are spaced apart around the 360° circumference such that their longitudinal slots 17 and 19 and the rollers 35 conform to the distribution and spacing of pins 16, 18 and slots 17, 19 of FIGS. 1 and 2. For clarity of presentation, stiffening flanges of the pipes, and the inner pipes to duct the hot gas, are omitted in FIG. 5.

FIG. 6 illustrates a pair of actuating elements consisting of two hydraulic actuators 36 and two units each comprising an hydraulic piston 37, a piston rod 38, and a rack 39. The latter is arranged in the actuator 36 opposite the piston rod, and has an associated pinion 41 arranged at either end of a flexible shaft 40. The interior chambers of the cylinders 36, which are separated from each other by the pistons 37, communicate crosswise with each other through lines 42 and 43. A control unit 44 routes oil under pressure to opposite sides of the pistons 37 through the lines 45 and 46, so that for pivoting the pipe 11 (FIGS. 1-3) or 31 (FIG. 5) about one or the other of the transverse axes 21 and 24, the two piston rods 38 are moved in opposite directions. The actuators are hinged to the fixedly mounted pipe 10 or 30 by means of a swivel lug 47 projecting from the cylinder 36, and are hinged to the pivotally arranged pipe 11 or 31 by a swivel lug 48 projecting from the piston rod 38.

The pair of actuating elements illustrated in FIG. 7 comprises two (screw type) spindles 49 and two nuts 50, two flexible shafts 51, a pair of synchronizing pinions 52, the actuating motor 53, and the laterally inverted bevel gearsets 54. The rear ends of the nuts 50 are hinged to the pivotally connected afterburner pipe 11 or 31 by universal joints or similar provisions. The bevel gearsets 54 are attached to the forward ends of the spindles 49, said ends being hinged to the fixedly arranged pipe (10 or 30) by means of a universal joint or other expedient. The pair of gears 52 is connected to the bevel gearsets through the shafts 51. A compensating shaft 55 of flexible construction serves to compensate the torques resulting from the axial forces. Such compensation serves to relieve the actuating drive, or the actuating motor 53, e.g., an air motor, which drives the two actuating elements or spindles 49. The actuating motor 53 will then have to overcome only the actuating moments and the friction. Reverse actuation is indicated by the arrowheads 56 through 59.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An exhaust section of a reaction engine comprising:
   (a) a fixed pipe,
   (b) a nozzle pipe carried by the fixed pipe,
   (c) two diametrically opposed pins projecting from each pipe, each pin being angularly spaced 90° from the pins of the other pipe,
   (d) two diametrically opposed slots in each pipe, each pin being located in a slot in the pipe other than the pipe which carries that pin, and
   (e) a plurality of actuating elements each extending between and pivoted to the exteriors of both pipes, the actuating elements being adjustable longitudinally to pivot the nozzle pipe with respect to the fixed pipe so as to alter the relative axial positions of the two pipes.

2. An exhaust section of a reaction engine as defined in claim 1 wherein when the centerlines of the two pipes are in alignment, a straight line passing through the pivotal connections between each actuating element and the pipes is parallel to the pipe centerlines, and wherein all the pins and all the actuating element pivotal connections are equidistantly spaced around the circumference of the pipes in planes normal to the pipes.

3. An exhaust section of a reaction engine as defined in claim 1 or 2 wherein each of the pivotal connections between the actuating elements and the nozzle pipe is angularly spaced circumferentially from one of the pins, all such angular spacings being equal to each other.

4. An exhaust section of a reaction engine as defined in claim 1 including four actuating elements equidistantly angularly spaced around the 360° circumference of the pipes.

5. An exhaust section of a reaction engine as defined in claim 1 wherein the pivotal connections of all the actuating elements to the nozzle pipe lie in a plane normal to the centerline of the pipe, said plane coinciding with or being spaced slightly aft of the plane containing all the pins when the centerlines of the two pipes are in alignment.

6. An exhaust section of a reaction engine as defined in claim 1, 2, or 4 wherein the pivotal connections between each actuating element and the pipes are in a longitudinal plane which also contains one of the pins, and one of the pivotal connections between each actuating element and one of the pipes is in the same plane as all the pins, that plane being normal to the centerlines of the pipes.

7. An exhaust section of a reaction engine as defined in claim 1 or 5 including four actuating elements equidistantly spaced around the circumference of the pipes, and means for longitudinally adjusting each pair of diametrically opposed actuating elements in opposite directions, so as to pivot the nozzle pipe about two axes at right angles to each other.

8. An exhaust section of a reaction engine as defined in claim 7 wherein each actuating element includes two cooperating actuating members, one of the actuating members being pivoted to the fixed pipe, and the other being pivoted to the nozzle pipe.

9. An exhaust section of a reaction engine as defined in claim 8 wherein one of the actuating members is a hydraulic cylinder, and the other actuating member is a piston slidable within the cylinder, a piston rod extending from the piston to the exterior of the cylinder.

10. An exhaust section of a reaction engine as defined in claim 9 wherein said adjusting means includes means for simultaneously pressurizing the opposite faces of the pistons of each pin of actuating elements so as to move those pistons in opposite directions, and including a rack and pinion associated with each of the pistons, the pinions being interconnected by a flexible shaft for synchronizing the movement of the pistons.

11. An exhaust section of a reaction engine as defined in claim 8 wherein one of the actuating members is a threaded spindle and the other actuating member is a nut into which the spindle is threaded.

12. An exhaust section of a reaction engine as defined in claim 11 including a motor, a pair of meshing gears driven by the motor, and a flexible shaft connected to each gear for driving one of the spindle and nut of each pair of actuating elements in opposite directions.

13. An exhaust section of a reaction engine as defined in claim 12 including a bevel gear set between each flexible shaft and its respective one of the spindle and nut.

14. An exhaust section of a reaction engine as defined in claim 1 including supporting arms projecting longitudinally from each pipe, each supporting arm being secured to its respective pipe by a three-point attachment, the slots being provided in the supporting arms, and the pins being carried by the supporting arms.

* * * * *